United States Patent [19]

Curtis et al.

[11] Patent Number: 4,793,047
[45] Date of Patent: Dec. 27, 1988

[54] METHOD OF ADJUSTING THE DISTRIBUTION OF LOCOMOTIVE AXLE LOADS

[75] Inventors: Daniel L. Curtis; William G. Skrzypczyk; Thumpassery J. Thomas, all of Erie, Pa.

[73] Assignee: General Electric Company, Erie, Pa.

[21] Appl. No.: 154,545

[22] Filed: Feb. 10, 1988

Related U.S. Application Data

[63] Continuation of Ser. No. 943,230, Dec. 18, 1986, abandoned.

[51] Int. Cl.$^4$ ............................................. B23Q 17/00
[52] U.S. Cl. ......................................... 29/407; 29/428; 105/199.3; 105/209
[58] Field of Search ................... 29/407, 428; 105/73, 105/75, 197 A, 198.7, 199 CB, 199.3, 209; 384/626

[56] References Cited

U.S. PATENT DOCUMENTS

| 2,772,596 | 12/1956 | Trussell | 384/626 |
| 2,907,282 | 10/1959 | Erzer | 105/185 |
| 4,532,685 | 8/1985 | Itoh et al. | 29/407 X |

Primary Examiner—Timothy V. Eley
Assistant Examiner—Frances Chin
Attorney, Agent, or Firm—Albert S. Richardson, Jr.

[57] ABSTRACT

A method of adjusting the weight distribution of a locomotive having a pair of interchangeable 3-axle asymmetrical truck assemblies comprising loading the locomotive body with its normal supply of fuel, water, etc., weighing the body, together with a pair of truck bolsters but without the other parts of the truck assemblies, to measure individually the weight at each of the four different bolster mount load points of each of the two separate bolsters, comparing the eight measured weights, respectively, with desired weights at the eight separate load points of the bolsters to determine the errors, if any, that need correction, selecting the sizes of shims that can be added at designated load points of the bolsters to reduce such errors to within specified limits based on stored data from which the influence of the added shim thicknesses on weight distribution is predicted, adding shims of the selected sizes to the designated load points, repeating the above-mentioned weighing and comparing steps, repeating the above-mentioned selecting, adding, and repeating steps unless the weight error at each load point is within the specified limits, checking the distribution, among the three axles of each truck assembly, of the truck assembly weight plus half of the locomotive body weight in a fixture that gives the truck frame a predetermined slope, adding whatever shims are needed at the spring seats of the respective axle springs of each truck assembly to obtain a desired weight distribution among the three axles thereof, securing all of the added shims in place, and placing the locomotive body on a pair of duplicate truck assemblies.

10 Claims, 5 Drawing Sheets

METHOD OF ADJUSTING THE DISTRIBUTION OF LOCOMOTIVE AXLE LOADS

CROSS-REFERENCE TO RELATED PATENT APPLICATION

This is a continuation of application Ser. No. 943,230 filed on Dec. 18, 1986, now abandoned.

BACKGROUND OF THE INVENTION

This invention relates to heavy, multi-axle, self-propelled traction vehicles known as locomotives, and it relates more particularly to an improved method of adjusting the distribution of the total static weight of a locomotive so that a predetermined distribution of axle loads is consistently obtained.

A locomotive typically comprises a body supported near its opposite ends on a pair of truck assemblies or bogies. The body includes a main frame or platform, a superstructure, and various systems, subsystems, apparatus and components that are located in the superstructure or attached to the platform. Each truck assembly includes a frame and two or more axle-wheel sets supporting the frame by means of journals near opposite ends of each axle. In addition, in a truck assembly of the kind herein contemplated, a "floating bolster" or centerplate is disposed between the truck frame and a cooperating load-transmitting pin on the underside of the platform.

In modern practice, each locomotive truck also includes two or more electric traction motors, one per axle-wheel set. Each motor is hung on an axle inboard with respect to the associated wheels, and its rotor is mechanically coupled via torque amplifying gearing to that axle. A 3-axle truck can be of either symmetrical or asymmetrical construction. If the center axle were located midway between the other two, the truck would be symmetric; if not, it would be asymmetric.

The electric current for the axle-mounted traction motors can be derived from a wayside source of electric power, or it can be generated on board the locomotive by a dynamoelectric machine driven by a prime mover that is mounted on the platform in the locomotive body. Usually the prime mover is a diesel engine, in which case the locomotive is popularly referred to as a diesel-electric locomotive. Locomotives weighing more than 300,000 pounds with engines rated more than 3,500 horsepower are common today.

Some locomotive users require that the total weight of each unit in a fleet of similar locomotives be distributed substantially equally on all of its axles when weighed at rest. When a locomotive is built in a normal manner, its static weight is not likely to be equally distributed among all of its axles, and the pattern of axle load distribution can vary appreciably from one locomotive to another of the same model. The weight on one (or more) axle might exceed a specified maximum axle load limit, while the weights on other axles of the same locomotive might be below a specified minimum load limit.

In order to control the axle load distribution, a special shimming procedure has heretofore been developed. After a diesel-electric locomotive has been built and diesel fuel, lube oil and cooling water have been added, the wheels of the fully equipped and serviced locomotive are individually weighed on a scale comprising two load cells for each axle of a truck to determine the actual load distribution among the respective axles of the locomotive. If the load distribution is not as desired, it is adjusted by selectively adding relatively thin metal spacers or shims to both the primary and the secondary suspension systems of the locomotive.

The primary suspension system of a locomotive comprises a plurality of conventional helical springs disposed in compression between spring seats on the respective axle journal boxes and cooperating pockets in the frame of each of the two locomotive trucks. The secondary suspension system typically comprises a plurality of rubber "bolster mounts" that provide controlled lateral motion. As is shown in U.S. Pat. No. 2,907,282-Erzer, such bolster mounts are disposed in compression between each truck frame and load points at four different corners of the cooperating floating bolster which in turn centrally supports one end of the locomotive body. Adding a shim between an axle spring and its spring seat, or between a bolster mount and its load point, will enable that elastic member to transmit more load (weight) for a given overall deflection, whereby a larger share of the total weight will shift to the corresponding load point on the axle or on the truck frame, as the case may be.

The sizes of the shims that are required at the respective axle springs and bolster mounts to obtain a predetermined axle load distribution could be determined for each locomotive by trial and error, but this would be very time consuming and expensive. Any increment in weight caused by an added shim at one point must of course result in a net weight decrement of equal amount at other load points, since the total weight of the locomotive is constant. On a locomotive having three axles per truck, there are six separate load points (two per axle) in the primary suspension system of each truck and eight separate load points (four per truck) in the secondary suspension system of the locomotive. Consequently the relationship between shims sizes and deviations from desired weight distribution is statically indeterminate.

Nevertheless, for each different locomotive model it is possible to prepare, from experimental measurements, tables or charts that show how variations of shim sizes at each different load point will influence the distribution of weight at all load points, and to combine such data in a useful matrix that correlates measured deviations between actual and desired weights at the respective load points to combinations of primary and secondary shims that will reduce the deviations to within acceptable limits. Such a matrix has been developed and is embodied in a computer program to predict the particular combination and sizes of shims that are required to obtain a substantially equal distribution of load on all six axles of a diesel-electric locomotive having three axles per truck. In practice, this program is executed twice. The first time it responds to the weight distribution data as measured by the six load cells of the above-mentioned scale to determine the required bolster shims. After these shims (if any) have been added to the secondary suspension, the locomotive is weighed again to re-measure the loads on its individual wheels, the corrected weight distribution data is entered in the computer, the program is run a second time, and the predicted axle shims are then added as a final adjustment to balance the axle loads.

There are two drawbacks in the foregoing method for equalizing the weight distribution of a locomotive. The shims that are added are not permanently attached, and they do not remain in place when a locomotive is "untrucked" (i.e., when its two trucks are removed from the locomotive body) for maintenance or repair purposes. Furthermore, if either truck were replaced by a different one, or if both trucks were replaced by a different pair, or if the axles were changed, the whole locomotive would need to be rebalanced. The interaction between locomotive body and trucks affects the weight distribution among the six axles, and therefore if the No. 1 truck were interchanged with the No. 2 truck the original shim set would no longer be suitable for the new combination of body and trucks. Consequently, trucks cannot be interchanged without reshimming.

A scale with separate load cells for the respective wheels of a locomotive truck has heretofore been used to check for equal weight distribution among the axles of the truck in a test rig wherein four rams are lowered in the same horizontal plane and with equal forces onto the respective load pads of the frame of an individual truck so as to match the load that will be impressed thereon when the locomotive body is placed on a pair of trucks. This checking method would be reasonably accurate if the truck were symmetrical with a center of gravity located substantially half way between its front and rear axles and if the weight of the locomotive body were divided equally among the load pads of the two trucks in service. But, for reasons explained hereinafter, the known method is not satisfactory for verifying equal axle loading in a locomotive having 3-axle asymmetrical trucks with floating bolsters.

SUMMARY OF THE INVENTION

Accordingly, a general objective of the present invention is to provide an improved method of manufacturing locomotives having a predetermined axle load distribution which is not appreciably changed if the No. 1 truck of the locomotive were interchanged with the No. 2 truck.

In carrying out the invention in one form, after all of the various parts and subsystems of a diesel-electric locomotive are constructed and finally assembled and after the locomotive is fully serviced, the locomotive body, together with two bolsters but without the other parts of a pair of 3-axle asymmetrical truck assemblies, is placed on a balancing fixture comprising two groups of four separate weighing stands arranged in quadrature so as to support the bolsters at their regular bolster-mount load points. Each weighing stand comprises a load pad supported by a set of vertical helical springs resting on top of a pedestal-mounted "load cell" that provides an output signal representative of the actual weight of any heavy object placed on top of the associated load pad. The upper surfaces of all eight load pads are in the same horizontal plane when unloaded, and all eight spring sets have the same stiffness.

The output signals from the eight load cells are compared with stored data representing the desired weights at the respective load points of the two bolsters. To permit truck interchangeability, the desired weights at the two forward load points of each bolster are substantially the same as the desired weights at the two rear load points of the same bolster. In addition, the sum of the desired weights at all four load points of the No. 1 bolster (i.e., the bolster supporting the operator's-cab end of the locomotive body) exceeds the sum of the desired weights at all four load points of the No. 2 bolster by a predetermined relatively small amount that will offset any expected weight transfer caused by truck asymmetry (which exists on 3-axle trucks, due to the off-center location of the middle axle and its traction motor).

If there is an appreciable discrepancy between the actual and desired total weight of the locomotive body and bolsters, it can be corrected by adding or subtracting ballast. If the actual weight distribution among the eight load points of the bolsters differs from the desired distribution, the errors are used to select from a predetermined influence matrix the sizes of shims required at designated load points to correct the errors. Then the truckless locomotive is raised, the indicated shims are installed at the designated load points, and the truckless locomotive is lowered onto the balancing fixture again. The weighing and comparing steps are repeated, and the new smaller errors (if any) are used with the same matrix to select additional shims which are then installed as before. Once all of the errors are acceptably small or negligible, the previously installed shims are secured to the bolster by set screws or the like, and the locomotive body and bolsters are removed from the balancing fixture.

While each of the 3-axle asymmetrical truck assemblies is separate from the locomotive body, its axle springs are shimmed to achieve a predetermined distribution, among the individual wheels of the truck, of the weight that will be impressed on the truck's four bolster mounts. So long as every truck is made with closely controlled tolerances of all critical dimensions of its respective parts, the axle spring shims required to achieve the desired load distribution can be determined experimentally for one such truck, and the same predetermined set of shims can then be installed as a standard in each duplicate truck assembly. Once the axle spring shims are installed, they are secured in place by welding or the like. To determine the standard shim size at each axle spring load point and to check each truck assembly for the desired axle load distribution, a special load-applying fixture is provided. In this fixture the respective weights of the three axles of each truck assembly are measured and compared while predetermined downward forces are being applied to the respective bolster mounts. If equal axle loads are desired, the fixture is arranged to apply the force on the two forward bolster mounts in a plane different than the plane of force application at the two rear bolster mounts to give the truck frame a predetermined slope with respect to a horizontal plane. The slope simulates the deflection or rotation of the platform of an assembled locomotive caused by the force moment that results from truck asymmetry.

Adjusting the weight distribution of all locomotive bodies and their respective bolsters as summarized above, before placing the bodies on their associated trucks, ensures that the locomotive bodies are consistent. When subsequently placed on trucks, every locomotive body will interact the same way with the trucks. All of the trucks in turn are manufactured, separately shimmed, and checked to ensure uniformity. Consequently, when any balanced body is placed on any two truck assemblies, the axle load distribution will be within the specified limits. In the presently preferred embodiment of the invention, each bolster is shimmed to substantially equalize the distribution of weight among its four load points, and the axle springs of each truck assembly are shimmed to ensure a balanced distribution of the locomotive axle loads. The static weight supported by each of the axles of a locomotive having balanced axle loads will be within 2.5% of the weight at any other axle of the same locomotive. In service, such a locomotive will experience less wheel flange wear than a locomotive with unequal axle loading.

The invention will be better understood and its various objectives and advantages will be more fully appreciated from the following description taken in conjunction with the accompanying drawings.

DETAILED DESCRIPTION

Figure 1:
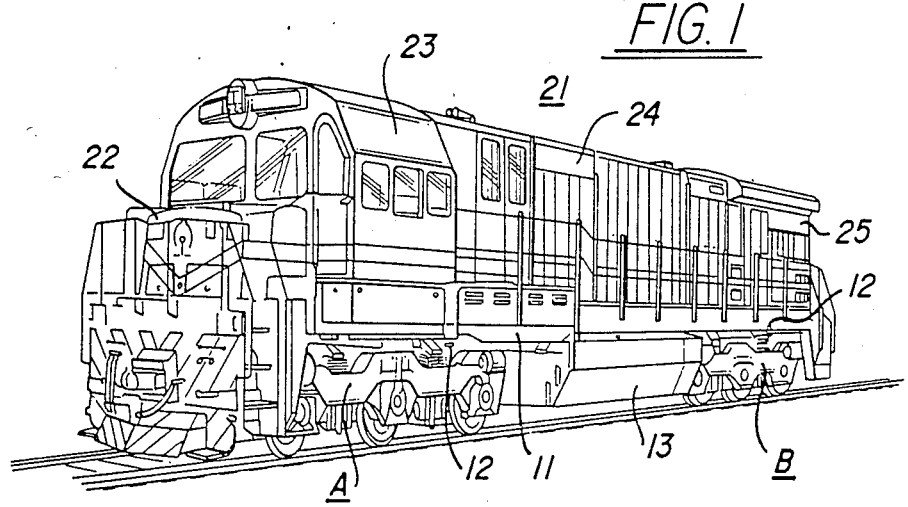
FIG. 1 is an isometric view of a conventional diesel-electric locomotive having a pair of three-axle truck assemblies.

As will be described hereinafter, the invention is used to adjust the axle load distribution of a diesel-electric locomotive having three axles per truck, such as shown in FIG. 1. However, persons skilled in the art will recognize that the invention is also useful for obtaining a desired axle load distribution on other types of locomotives and on locomotives having either two or four axles per truck.

The locomotive shown in FIG. 1 comprises a main frame or platform 11, a superstructure 21, and two duplicate three-axle truck assemblies A and B. The platform and superstructure are herein jointly referred to as the "body" of the locomotive. The platform 11 has four lifting hooks 12, two on each side, to which cables from an overhead crane can be conveniently attached for the purpose of lifting or lowering the locomotive body. A large tank 13 that holds diesel fuel oil is attached to the underside of the platform 11 between the trucks. The platform has compartments (not shown) near opposite ends thereof for receiving ballast.

The superstructure 21 includes a nose cab 22, an operator's cab 23, an engine cab 24, and a radiator cab 25. Hereinafter the operator's-cab end of the locomotive will be referred to as the "No. 1" or "front" end, and the opposite end will be referred to as the "No. 2" or "rear" end. The operator's cab 23 houses the usual apparatus and systems used by the operator to select the locomotive's propulsion power and direction of movement, to control its braking, and to monitor its performance. The engine cab 24 houses a large diesel engine having 12 or more water-cooled cylinders. Conventional support systems for the engine include fuel pumps and a fuel oil line to the diesel fuel tank 13, a lube oil pump and an oil line to a supply of engine lubricating oil, and a water pump connected via water pipes to a water tank and to heat exchangers in the radiator cab 25. An equipment blower and a box for the locomotive battery are also located in the vicinity of the engine cab 24. The crankshaft of the engine is mechanically coupled to the rotor of electric power generating means such as a relatively large alternator. The alternator in turn is connected via a power rectifier and insulated electric cables to traction motors that are hung on the respective axles of the two truck assemblies A and B.

Figure 2:
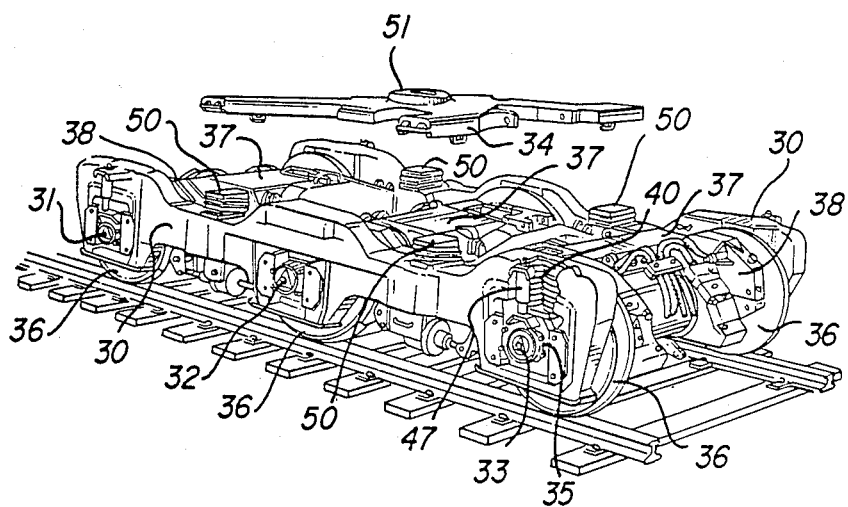
FIG. 2 is an isometric view, partly "exploded," of a three-axle locomotive truck assembly.

As is shown in FIG. 2, each truck assembly comprises a strong metal frame 30, three parallel axle-wheel sets 31, 32, and 33, and a floating bolster 34. Each axle-wheel set supports the frame by means of a pair of conventional journals located in housings 35 near opposite ends of the axle on the outboard sides of the associated wheels 36. Axle-hung electric traction motors 37 are disposed between the wheels of the respective axle-wheel sets, and the rotor of each motor is mechanically coupled to the associated axle-wheel set by gearing housed in a gear box 3B. In a conventional manner, the traction motors associated with the front and middle axles 31 and 32 are located to the rear of these axles, respectively, whereas the traction motor associated with the rear axle 33 is located to the front thereof.

The primary suspension system of each truck comprises twelve dual, concentrically nesting, vertical helical springs (sometimes called coil springs) arranged in six sets of two each, with the springs in each set being disposed in compression between a spring seat on top of a separate one of the axle journal housings 35 and a cooperating pocket in a side channel of the frame 30. The outboard wall of one such pocket has been cut away in FIG. 2 to reveal a typical pair 40 of these nesting springs. A shock absorber or "snubber" 47 is connected in parallel with at least one set of axle springs on each side of the truck assembly.

The secondary suspension system of each truck comprises four rubber bolster mounts 50 which are respectively seated on pads located on top of the inter-axle sections of the two side channels of the truck frame 30. These bolster mounts support the bolster 34 at load points near the four corners thereof. FIG. 2 shows the bolster 34 detached from the rest of the truck assembly so as to expose the four bolster mounts 50. Each bolster mount comprises a unitary stack of curved rubber pads interleaved with correspondingly curved steel plates. The rubber pads are relatively soft horizontally and will deflect in shear to permit a controlled amount of lateral motion between opposite ends of the bolster mount, which motion is accompanied by a slight extension or contraction of the mount. The rubber pads are sufficiently stiff in the vertical plane to prevent undesirable tilting of the truck frame.

In the middle of each floating bolster 34 there is a circular plate 51 adapted to receive one of a pair of large diameter bearing pins or bosses on the underside of the locomotive body near opposite ends of the platform 11. The static weight of the locomotive body is transmitted via such pins to the centers of the respective bolsters on the two truck assemblies A and B. This cooperating bearing pin and centerplate arrangement permits each truck assembly to swivel with respect to the locomotive body as the wheels 36 negotiate a curved section of track.

Figure 3:
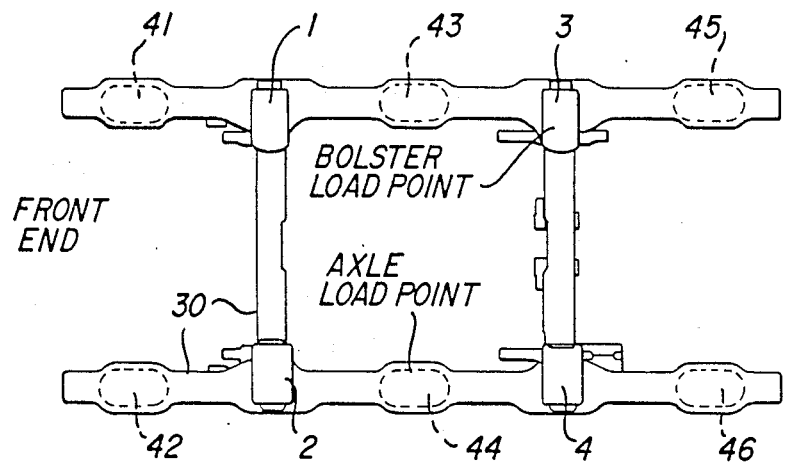
FIG. 3 is a simplified plan view of the frame of the truck assembly shown in FIG. 2.

A simplified plan view of a truck frame 30 is shown in FIG. 3. In this figure, reference numbers 1 through 4 identify the top surfaces or bolster load points of the respective bolster mounts 50, and reference numbers 41 through 46 identify the positions of the respective axle spring pockets in the two side channels of the frame. The four bolster mounts are centered between the front and rear axles of the truck assembly. Bolster load points 1 and 2 and axle spring pockets 41 and 42 (for axle-wheel set 31) are located in the front half of the truck assembly, whereas bolster load points 3 and 4 and axle spring pockets 45 and 46 (for axle-wheel set 33) are similarly located in the rear half. This 3-axle truck assembly is asymmetrical, with the centerline of its middle axle-wheel set 32 being disposed slightly (e.g., two inches) in front of the center of the truck assembly to provide extra space for the two traction motors that are located in the one gap between middle and rear axles. Consequently, the middle pair of axle spring pockets 43 and 44 in the truck frame are slightly off center. If equal loads are desired on the three axles of the assembly, the front and rear pairs of bolster load points must be unequally loaded, with more weight on points 1 and 2 than on points 3 and 4.

To equalize the static distribution of the total locomotive weight on the respective axle-wheel sets of the two truck assemblies A and B, it is a known practice to shim the bolster mounts and the axle springs after the locomotive body and trucks are manufactured and assembled and the locomotive has been fully serviced. Without the added shims, the axle load distribution may vary appreciably from unit to unit of the same locomotive model. This is because various structural members and components of the locomotive can vary slightly, from one unit to another, in dimensions, weights and/or elasticity. Another reason for shimming the axle springs is to compensate for differences in wheel diameters caused by unequal wear.

Figure 4:
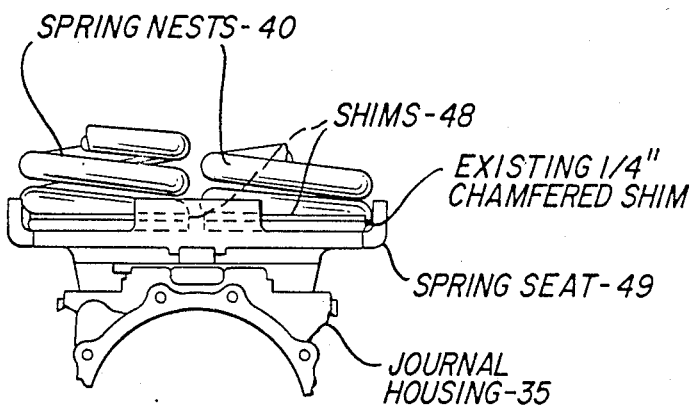
FIG. 4 is an enlarged side elevation of a portion of the primary suspension system of the truck assembly shown in FIG. 2.

FIG. 4 illustrates how disk-like steel shims 48 of preselected thickness (e.g., 0.25 or 0.5 inch) can be inserted between a pair of the nesting axle springs 40 and a spring seat 49 on top of the associated journal housing 35. Ordinarily the shim thickness will be the same at both ends of an axle. The added shims increase the share of the per-truck load that the axle springs will transmit from the truck frame to the associated axle-wheel set. Alternatively, inserting shims between the spring seat 49 and the axle journal housing 35 will produce the same effect. (In the latter case retaining bars may need to be welded to the top of the journal housing to keep the shims in place.)

The present invention enables the axle load distribution to be adjusted in an improved manner that permits truck A to be interchanged with truck B without reshimming. In the presently preferred embodiment of the invention, a substantially equal or balanced axle load distribution is obtained. Alternatively, the invention can be used if desired to ensure that a predetermined unequal but consistent distribution of axle loads is obtained on a locomotive having either two, three or four axles per truck.

Figure 5:
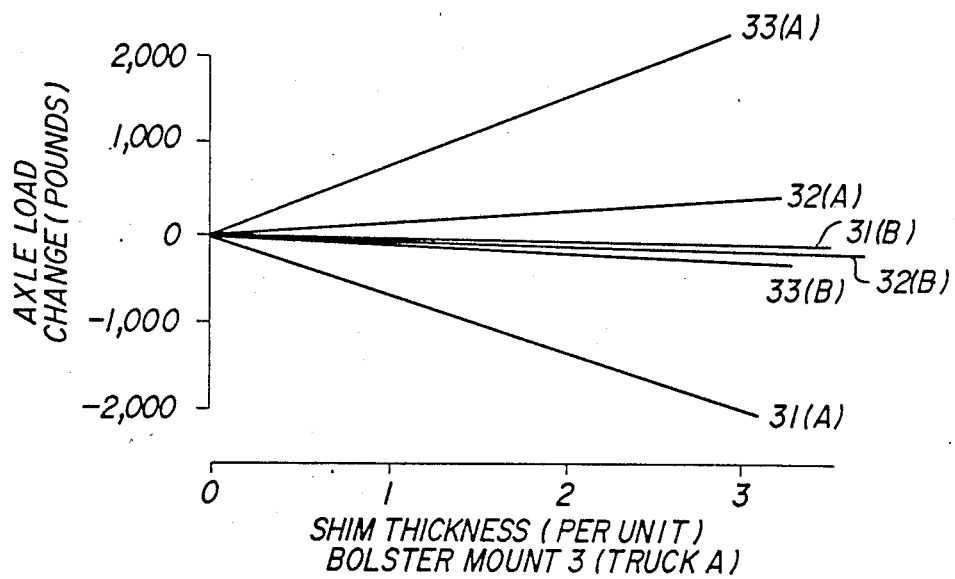
FIG. 5 is a chart showing how axle loads change with variations in shim thickness at one of the bolster mounts of a locomotive truck assembly.

It has been observed that adding shims at the axle springs of any one axle not only increases the load on that axle but also changes the load sharing of the other two axles of the same truck assembly and, to a lesser degree, the load sharing of the three axles of the companion truck assembly. Similarly, adding a shim at any one bolster load point not only increases the load transmitted by the associated bolster mount but also affects the load sharing among all other bolster mounts of both truck assemblies. The actual relationship between shim thickness added at each different load point and the resulting load changes on all six axles is determined by a series of experimental measurements. FIG. 5 shows such a relationship, by way of example, for shims added at the bolster load point 3 of truck A of a locomotive whose body weighed approximately 200,000 lbs. and whose three-axle truck assemblies weighed approximately 50,000 lbs. each.

In accordance with the present invention, the desired axle load distribution is obtained by performing two main routines: (1) balancing each truck assembly separately from the locomotive body, and (2) after the locomotive is built, removing its body and the two bolsters from the other parts of the truck assemblies and balancing the truckless locomotive. As a result, the bodies of all units of a given locomotive model will be uniform with respect to the distribution of static weight (load) among the four separate bolster mounts at each end of each unit, the truck assemblies of all units will be uniform with respect to the redistribution of the known bolster mount loads among the three axles of each truck, and the desired axle load balance will not be disturbed by interchanging truck assemblies.

Figure 6:
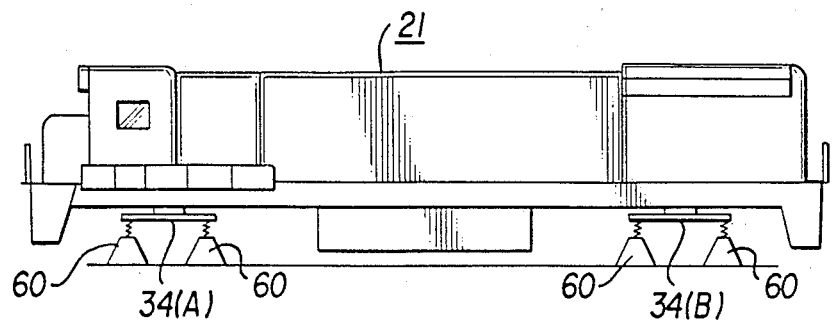
FIGS. 6 and 7 are simplified side and end views, respectively, of a truckless locomotive in a weight balancing fixture that is used in practicing the method of the present invention.
Figure 7:
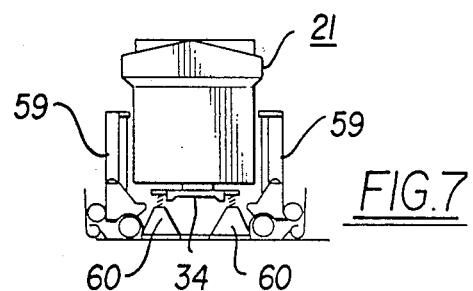

The method of balancing the locomotive body will now be described with reference to FIGS. 6–9. FIGS. 6 and 7 are simplified side and end views, respectively, of the locomotive body 21 together with its two bolsters 34 on a special balancing fixture comprising 2 groups of 4 separate load-measuring stations 60 which are herein referred to as "weighing stands." The locomotive body and bolsters were lifted from the other parts of the two truck assemblies and placed on this balancing fixture by means of a crane (not shown). During this step the bolsters 34 are attached to the body 21 by conventional safety hooks (not shown) suspended from the underside of the locomotive platform. There are two freestanding jacks 59 along each side of the balancing fixture. Although omitted in FIG. 6 to avoid obscuring the weighing stands, these jacks in practice are respectively aligned with the four lifting hooks (12) on the locomotive platform. They are used to lift the truckless locomotive when desired for initializing the settings of the respective weighing stands 60 or for providing access to the bolster load points in order to add shims.

Before the locomotive body is weighed, it is loaded with the supplies normally used in operation. For instance, the fuel tank is filled with diesel fuel oil, water is supplied to the cooling water tank, pipes and heat exchangers, lubricating oil is supplied to the engine lube oil system, and a locomotive battery is put in the battery box (or an object weighing the same as the battery is placed on top of the battery box covers).

Figure 8:
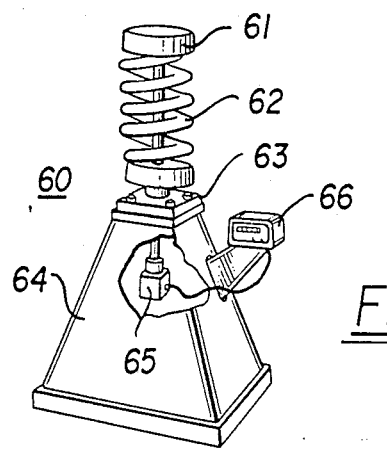
FIG. 8 is an enlarged view of one of the weighing stands of the balancing fixture shown in FIGS. 6 and 7.

In each of the two groups of weighing stands 60 the four stands are arranged in quadrature to support the associated bolster 34 at its four bolster-mount load points. In other words, each of the eight stands is aligned with a different one of the regular bolster mount load points of the two bolsters. As is shown in FIG. 8, each stand 60 comprises a load pad 61 supported by a set 62 of vertical helical springs resting on top of a load cell 63 which in turn is mounted on a pedestal or base 64. Although in FIG. 8, for purposes of drawing simplification, the spring set 62 is shown as a single spring, in practice it is a parallel array of three or four such springs symmetrically disposed with respect to the vertical centerline of the load pad 61 and the load cell 63. The spring sets of all eight of the weighing stands 60 have the same stiffness, and the upper surfaces of all eight load pads are in the same horizontal plane when unloaded. Each weighing stand includes a transducer 65 for converting the mechanical strain in the load cell 63 to an electric output signal having a value representative of the actual weight of any heavy object placed on top of the associated load pad 61. This signal is supplied to a digital scale 66 associated with each weighing stand so that the weight measured by each stand can be individually displayed or "read out."

After the fully serviced truckless locomotive is in place on the balancing fixture and the scales at the respective weighing stands are initialized, the load that is impressed on each weighing stand is measured and recorded, the weights that are individually measured by the four stands in each group are added together to find the static weight of the front and rear ends, respectively, of the locomotive body and bolsters, and the weights of both ends are added together to find the actual total static weight of the truckless locomotive. The latter weight is compared with the desired total weight, and if there is an appreciable difference (e.g., more than approximately 200 pounds) the error is corrected by adding or removing ballast to or from the locomotive platform. In addition, the actual weights of the front and rear ends are compared with each other, and any undesired discrepancy is corrected by shifting ballast from one end of the platform to the other end.

In practice, the front end of the locomotive body 21 should be slightly (e.g., 2,500 pounds) heavier than the rear end so as to offset the expected transfer of static weight from the front bolster to the rear bolster when the locomotive body is placed on the two truck assemblies A and B. Such a weight transfer occurs because these three-axle trucks are asymmetrical, with the middle axle of each truck assembly being slightly in front of center. As a result, when the locomotive body is placed on a pair of matched truck assemblies, the static weight that its front end impresses on the centerplate of the truck A bolster will decrease by a certain amount (e.g., approximately 1,250 pounds) and the static weight that its rear end imposes on the centerplate of the truck B bolster will increase by the same amount. Consequently, in service the weight of the locomotive body will be substantially equally divided between trucks A and B.

The weights that are individually measured by the eight weighing stands of the balancing fixture are compared with the weights that are desired at the respective load points of the two bolsters, and the differences or errors (if any) are calculated. If any of the errors are determined to be outside of specified limits, the weight distribution needs to be adjusted by adding shims at some of the bolster load points. In the illustrated embodiment of the invention, 200 pounds is the maximum permissible difference between the sum of the weights at the two front load points 1 and 2 (see FIG. 4) and the sum of the weights at the two rear load points 3 and 4 of each bolster, 500 pounds is the maximum permissible weight difference between the two odd-numbered load points 1 and 3, 500 pounds is also the maximum permissible weight difference between the two even-numbered load points 2 and 4, 2,000 pounds is the maximum permissible weight difference between the front two load points 1 and 2, and 2,000 pounds is also the maximum permissible weight difference between the two rear load points 3 and 4.

To achieve the desired balanced distribution of static weight among the eight load points of the bolsters, all of the above-mentioned criteria need to be satisfied. The weight recording, comparing and calculating steps described above can be performed manually by a person using the measured weights that are indicated on the scales 66 of the eight individual weighing stands 60 and using the desired weights and weight tolerances that are indicated in written process instructions. Alternatively, the output signals of the respective weighing stands are compared with electronically or magnetically stored data representing the desired weights at the respective load points of the two bolsters, and the error calculations are performed automatically. In the presently preferred embodiment of the invention, a computer is programmed to carry out the comparing and calculating steps of the method.

Once the errors between the actual weight distribution and the desired weight distribution are calculated, they are used to select from a predetermined influence matrix the locations and sizes of shims required to correct the errors. The influence matrix is prepared from a family of experimental measurements such as the one charted in FIG. 5 and described hereinbefore. Based on such data, this matrix enables the actual weight errors at the respective load points of the two bolsters to be correlated to shim sizes that can be added at designated load points to reduce the errors to within specified limits. In the presently preferred embodiment of the invention, such a matrix is stored in the memory of the computer program so as to expedite the shim selecting step of the method.

Figure 9:
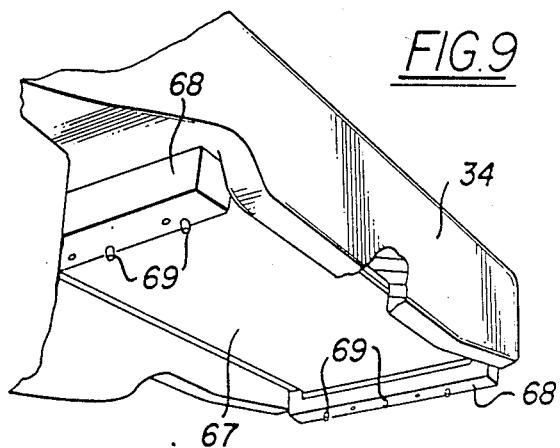
FIG. 9 is an isometric view of a corner of the floating bolster of the truck assembly shown in FIG. 2.

The next step of the method is to raise the truckless locomotive from the weighing stands, add the indicated shims at the designated load points of the two bolsters, and then lower the truckless locomotive onto the weighing stands again. FIG. 9 illustrates how at least one flat, rectangular steel shim 67 of preselected thickness (e.g., approximately 0.3 inch or less) can be added to a load point at a typical corner of the bolster 34. A pair of slotted metal rails 68 are anchored to the bolster in spaced, parallel relationship to one another, and their dimensions are suitable to permit the selected shim (or shims) 67 to be inserted into the slots. A plurality of set screws 69 are used for capturing the shim in this position where it will be sandwiched between the bolster load point and the bolster mount that supports this corner of the bolster when the locomotive body is placed on the two truck assemblies of the locomotive.

After adding the selected shims and lowering the truckless locomotive, the above-described weighing and comparing steps are repeated, the errors are recalculated, and the new smaller errors (if any) are used with the same matrix to select additional shims which are then installed as before. Once all of the errors are acceptably small or negligible, the set screws 69 are tightened at all load points so as to secure the previously installed shims to the associated bolster, and the truckless locomotive is moved from the balancing fixture to a pair of duplicate truck assemblies A and B.

As previously mentioned, each of the duplicate 3-axle asymmetrical truck assemblies is balanced while separate from the locomotive body. Preferably this is done by permanently installing a predetermined set of axle spring shims (see FIG. 4) in each truck assembly. This "standard" set of shims is selected to ensure that the total load on each truck, including the weight of the truck assembly itself, will be shared equally by the three axles when a pair of duplicate trucks are finally assembled with a locomotive body and bolsters that were separately balanced as described hereinbefore. The preferred technique is feasible so long as each truck assembly is made with closely controlled tolerances of all critical dimensions of its respective parts. For instance, the spring constants and compressed heights of all axle spring sets 40 on each truck assembly need to be closely matched as do the flexural characteristics of all bolster mounts 50. Tight dimensional tolerances need to be specified for the bolster mount seating surfaces and for the axle spring pockets in the truck frame 30, and the reaction centerlines of the bolster mounts and axle springs need to be as parallel as possible. When manufactured in this manner, the different parts of each truck assembly will be interchangeable with the corresponding parts of any duplicate truck.

Alternatively, each truck assembly can be placed in a special load-applying fixture to individually select the shim sizes at each axle spring load point, based on another predetermined influence matrix that correlates measured deviations between actual and desired axle loads to combinations of axle spring shims that will reduce the deviations to within acceptable limits. Once the required shims are installed, they are secured to the axle spring seats (49) or directly to the truck frame (30) by welding or the like.

Figure 10:
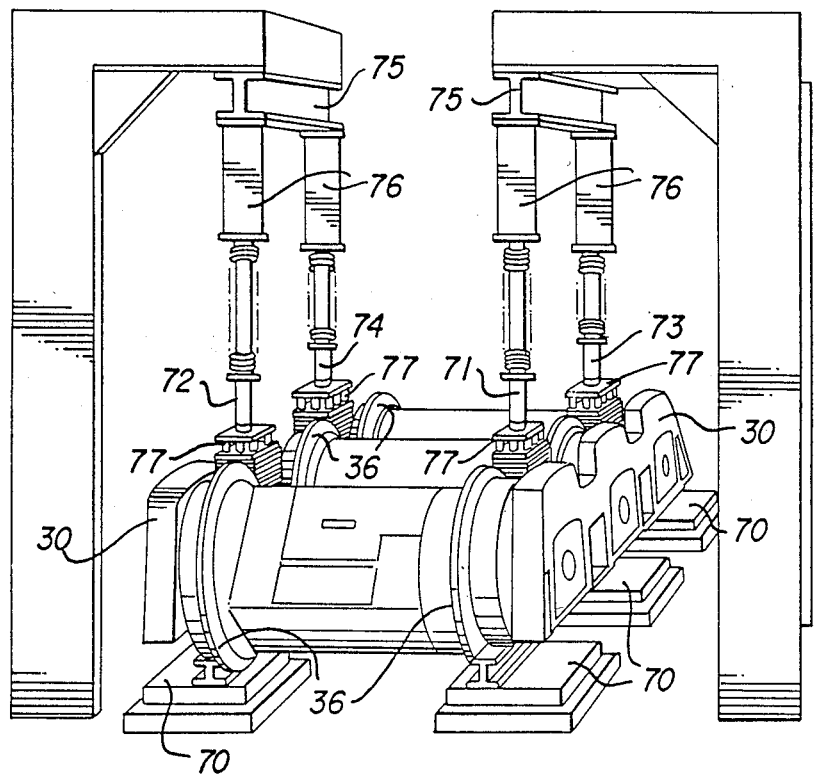
FIG. 10 is a simplified isometric view of a truck assembly in a test fixture that is used to ensure equal axle loads.

FIG. 10 shows a typical three-axle truck assembly, complete except for its floating bolster which has been removed, in a test fixture that is used for two purposes: (1) to check the bolster-less truck for proper axle load distribution after a standard set of axle spring shims has been installed, and (2) to select the standard axle spring shims that need to be installed to obtain the proper distribution, among the three axles of the truck, of the weight of the bolster-less truck plus the weight that will be impressed on its bolster mounts when the locomotive body and bolster are placed thereon.

As is indicated in FIG. 10, the test fixture comprises six separate load-measuring stations or load cells 70 which respectively support the six wheels 36 of the truck assembly in the same horizontal plane. The load cells are used for individually measuring the static loads (weights) that are impressed thereon by the respectively associated wheels. The fixture includes four vertical rams 71–74 arranged in two groups of two each on opposite sides of the truck assembly, with the rams in each group being suspended from an overhead I-beam 75 in alignment with the two bolster mounts (50) on the corresponding side of the bolster-less truck assembly. Each ram has a hybrid mechanism 76 (comprising an electrically driven screw jack and a hydraulic cylinder) for lowering a load pad 77 into abutting contact with the top of the associated bolster mount and for applying a predetermined force downwardly on that bolster mount. Preferably the vertical displacement of the load pads 77 of the two front rams 71 and 72 differs from that of the load pads 77 of the two rear rams 73 and 74 by a controlled amount to give a predetermined slope to the truck frame with respect to a horizontal plane so as to simulate the relative rotation of the locomotive platform with respect to the truck frame when the truckless locomotive is placed on a pair of duplicate truck assemblies. Such platform rotation or deflection occurs because the truck assemblies A and B are asymmetrical. In order to obtain the desired equalization of axle loads, the front pair of bolster mounts in each of these trucks will be more heavily loaded than the rear pair. Consequently the resultant load is not colinear with the vertical centerline of the bolster, and this will produce a moment in the associated bearing pins on the underside of the platform 11 that deflects the platform as noted. By constructing and arranging the test fixture to apply downward force on the front pair of bolster mounts in a plane that is slightly elevated with respect to the plane in which force is applied to the rear pair of bolster mounts, the four bolster mounts are respectively loaded with the same static weights to which they will be actually subjected when the separately balanced locomotive body and bolsters are placed thereon. The reaction loads on the six load cells 70 of the test fixture are then measured and analyzed to determine how the total load is actually distributed among the three axles of the truck assembly.

In the illustrated embodiment of the invention, the maximum permissible weight difference between any two axles is 500 lbs., and the individually measured loads on the two wheels of each axle must be within 8% of each other. If the actual loads differ from the desired loads by more than these amounts, the errors are used to select from the last-mentioned influence matrix the locations and sizes of axle spring shims required to reduce the errors to within specified limits. The rams 71–74 are them released and the indicated shims are added at the designated axle spring load points, and the above-described procedure is recycled to check the axle load distribution again.

While a preferred embodiment of the invention has been shown and described by way of illustration, various modifications thereof will probably occur to persons skilled in the art. It is therefore intended by the concluding claims to cover all such changes and modifications as fall within the true spirit and scope of this invention.

We claim:

1. A method of adjusting the weight distribution of a locomotive having a body supported on a pair of asymmetrical 3-axle truck assemblies each of which includes a frame, at least six separate axle springs and a floating bolster, to obtain a predetermined distribution of the loads on the respective axles of the locomotive after it has been built, comprising the steps of:
   a. loading the locomotive body with fuel, water, and other supplies that the locomotive normally uses in operation;
   b. placing the body, together with the pair of truck bolsters but without the other parts of the truck assemblies on a balancing fixture comprising eight separate weighing stands arranged in two groups of four each, the four stands of each group being respectively aligned with the regular bolster mount load points of the bolster supported thereon, whereby each stand measures the weight at a different load point of the bolster;
   c. measuring the actual weight that the truckless locomotive impresses on each of the eight weighing stands;
   d. comparing the eight actual weights, respectively, with desired weights at the eight separate load points of the two bolsters to determine the errors, if any, that need correction;
   e. using the errors between actual and desired weights to select from a predetermined influence matrix the locations and sizes of shims required to correct the errors;

f. raising the locomotive body and bolsters, adding the selected shims at the designated load points of the bolsters, and lowering the body and bolsters onto the balancing fixture;

g. repeating steps c and d above;

h. repeating steps e, f and g above, unless the weight error at each load point is within predetermined limits;

j. securing all of the added shims to the associated bolster;

k. removing the locomotive body and bolsters from the balancing fixture;

m. installing, at the spring seats of the respective axle springs of each of the locomotive truck assemblies, whatever shims are needed to obtain a desired weight distribution among the three axles of each truck assembly when the locomotive body is placed on both truck assemblies;

n. checking the distribution, among the three axles of each truck assembly, of the truck assembly weight plus the locomotive body weight that will be impressed on the truck assembly by applying predetermined downward forces to the respective load points of the four bolster mounts thereof, with the force on the two forward load points being applied in a different plane than the force on the two rear load points to give the frame of the truck assembly a predetermined slope with respect to a horizontal plane; and o. placing the locomotive body on the pair of truck assemblies.

2. The method as in claim 1, in which each weighing stand comprises a load pad supported by a set of vertical helical springs resting on top of a pedestal-mounted load cell that measures the weight impressed on the associated load pad, and in which the upper surfaces of the load pads of all eight weighing stands are in the same horizontal plane when unloaded.

3. The method as in claim 1, in which the sum of the desired weights at the two forward load points of each bolster is substantially the same as the sum of the desired weights at the two rear load points of the same bolster.

4. The method of claim 3 for substantially equalizing the load distribution among the six axles of the locomotive.

5. The method as in claim 4, in which the sum of the desired weights at the four load points of a predetermined one of the bolsters exceeds the sum of the desired weights at the four load points of the other bolster by a predetermined relatively small amount that will offset the weight transfer caused by truck asymmetry.

6. A method of adjusting the weight distribution of a locomotive having a body supported on a pair of asymmetrical 3-axle truck assemblies each of which includes a frame, at least six separate axle springs and a floating bolster, to obtain a substantially equal distribution of the loads on the respective axles of the locomotive after it has been built, comprising the steps of:

a. loading the locomotive body with fuel, water, and other supplies that the locomotive normally uses in operation;

b. individually measuring the actual weight of the body, together with the pair of truck bolsters but without the other parts of the truck assemblies, at each of the four regular bolster mount load points of each of said bolsters;

c. comparing the eight actual weights, respectively, with desired weights at the eight separate load points of the two bolsters to determine the errors, if any, that need correction;

d. using the errors between actual and desired weights to select from a predetermined influence matrix the locations and sizes of shims that will reduce the errors to within specified limits;

e. adding the selected shims at the designated load points of said bolsters;

f. repeating steps b and c above;

g. repeating steps d, e and f above unless the weight error at each load point is within said specified limits;

h. securing all of the added shims to the associated bolster;

j. checking the distribution, among the three axles of each of the locomotive truck assemblies, of the truck assembly weight plus the locomotive body weight that will be impressed on the truck assembly by applying predetermined downward forces to the respective load points of the four bolster mounts thereof, with the force on the two forward load points being applied in a different plane than the force on the two rear load points to give the frame of the truck assembly a predetermined slope with respect to a horizontal plane;

k. securing, at the spring seats of the respective axle springs of each truck assembly, whatever shims are needed to substantially equalize the weight distribution among the three axles of the truck assembly when the locomotive body is placed on both truck assemblies; and m. placing the locomotive body on the pair of truck assemblies.

7. The method as in claim 6, in which the sum of the desired weights at the two forward load points of each bolster is substantially the same as the sum of the desired weights at the two rear load points of the same bolster.

8. The method as in claim 7, in which the desired weight difference between either forward load point of each bolster and the corresponding rear load point of the same bolster is less than a predetermined amount.

9. The method as in claim 7, in which the sum of the desired weights at the four load points of a predetermined one of the bolsters exceeds the sum of the desired weights at the four load points of the other bolster by a predetermined relatively small amount that will offset the weight transfer caused by truck asymmetry.

10. The method as in claim 6, in which said influence matrix is prepared from a family of experimentally determined data indicating, for the respective bolster mount load points of the bolsters of the respective truck assemblies, the manner in which the locomotive axle loads change with increasing shim thickness at each of said load points.

* * * * *